(12) United States Patent
Lei et al.

(10) Patent No.: US 12,092,011 B2
(45) Date of Patent: Sep. 17, 2024

(54) SYSTEM AND METHOD FOR MITIGATING HIGH SULFUR FUEL IMPACT FOR DOC/DPF SYSTEM

(71) Applicant: Cummins Emission Solutions Inc., Columbus, IN (US)

(72) Inventors: Yinghuan Lei, Columbus, IN (US); Todd A. Corbet, Franklin, IN (US); Jinqian Gong, Columbus, IN (US); Vijay Ramchandra Kadam, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 17/761,672

(22) PCT Filed: Sep. 20, 2019

(86) PCT No.: PCT/US2019/052182
§ 371 (c)(1),
(2) Date: Mar. 18, 2022

(87) PCT Pub. No.: WO2021/054975
PCT Pub. Date: Mar. 25, 2021

(65) Prior Publication Data
US 2022/0389853 A1    Dec. 8, 2022

(51) Int. Cl.
*F01N 9/00* (2006.01)
*F01N 3/02* (2006.01)
(Continued)

(52) U.S. Cl.
CPC ............. *F01N 9/002* (2013.01); *F01N 3/023* (2013.01); *F01N 3/20* (2013.01); *F01N 11/00* (2013.01)

(58) Field of Classification Search
CPC ....... B01D 53/94; B01D 53/9477; F01N 3/00; F01N 3/021; F01N 3/023; F01N 3/10;
(Continued)

(56) References Cited

U.S. PATENT DOCUMENTS 8,141,348 B2 * 3/2012 Baird .................... F01N 9/002
60/287
2003/0041594 A1 * 3/2003 van Nieuwstadt .... F01N 3/2066
60/285

(Continued)

OTHER PUBLICATIONS

Hu et al. "Sulfur Poisoning and Regeneration of Pd Catalyst under Simulated Emission Conditions of Natural Gas Engine," SAE International 2007-01-4037, 2007, 9 pages.
(Continued)

*Primary Examiner* — Dapinder Singh
(74) *Attorney, Agent, or Firm* — Foley & Lardner LLP (57) ABSTRACT

A system and method include determining, by a controller associated with an aftertreatment system, satisfaction of an enabling condition and in response to the satisfaction of the enabling condition pausing, by the controller, hydrocarbon dosing in a regeneration cycle of the aftertreatment system. The system and method also include upon pausing of the hydrocarbon dosing, monitoring, by the controller, an oxidation catalyst of the aftertreatment system for a light-off shift condition.

23 Claims, 4 Drawing Sheets

(51) Int. Cl.
*F01N 3/023* (2006.01)
*F01N 3/20* (2006.01)
*F01N 11/00* (2006.01)

(58) Field of Classification Search
CPC . F01N 3/20; F01N 3/28; F01N 3/0814; F01N 3/0222; F01N 3/101; F01N 3/103; F01N 3/2033; F01N 3/0835; F01N 3/022; F01N 3/281; F01N 3/025; F01N 5/02; F01N 9/002; F01N 9/00; F01N 11/00; F01N 11/005; F01N 11/002; F01N 2370/04; F01N 2370/12; F01N 2560/06; F01N 2610/02; F01N 2510/06; F01N 2550/02; F01N 2550/04; F01N 2250/02; F01N 2900/0422; F01N 2900/1811; F01N 2570/12; F01N 2430/00; Y02T 10/12; Y02T 10/40
See application file for complete search history.

(56) References Cited

U.S. PATENT DOCUMENTS

| | | |
|---|---|---|
| 2006/0201142 A1 | 9/2006 | Marlett et al. |
| 2010/0050609 A1 | 3/2010 | Parmentier et al. |
| 2011/0106392 A1 | 5/2011 | Verner et al. |
| 2011/0120091 A1 | 5/2011 | Leu et al. |
| 2013/0213008 A1 | 8/2013 | Kumar et al. |
| 2014/0331644 A1 | 11/2014 | Kumar et al. |
| 2015/0113947 A1 | 4/2015 | Ancimer et al. |
| 2019/0085778 A1* | 3/2019 | Kurtz ............... F01N 9/002 |
| 2022/0389853 A1* | 12/2022 | Lei ..................... F01N 3/10 |

OTHER PUBLICATIONS

International Search Report and Written Opinion based PCT Application No. PCT/US2019/052182 dated Nov. 25, 2019, 22 pages.
Millo et al. "Impact of high sulfur fuel and de-sulfation process on a close-coupled diesel oxidation catalyst and diesel particulate filter," Fuel 198 (2017) 58-67.

* cited by examiner

SYSTEM AND METHOD FOR MITIGATING HIGH SULFUR FUEL IMPACT FOR DOC/DPF SYSTEM

CROSS-REFERENCE TO RELATED APPLICATION

The present application is a National Stage of PCT application No. PCT/US2019/052182, filed Sep. 20, 2019. The contents of this application are hereby incorporated by reference in their entirety.

TECHNICAL FIELD

The present disclosure relates generally to aftertreatment systems for use with internal combustion engines.

BACKGROUND

An aftertreatment system is used to treat exhaust gas generated by an internal combustion engine. The aftertreatment system may include a selective catalytic reduction system that is formulated to reduce oxides of nitrogen in the exhaust gas in the presence of a catalyst and reductant. The aftertreatment system may also include a particulate filter to remove debris and other particulates from the exhaust gas, as well as an oxidation catalyst to oxidize nitric oxide and hydrocarbons from the exhaust gas. By treating the exhaust gas using the aftertreatment system, the aftertreatment system reduces the levels of harmful emissions in the exhaust gas that would otherwise be emitted into the atmosphere. However, present day aftertreatment systems have limitations due to their configuration and the way they operate.

SUMMARY

In accordance with one aspect of the present disclosure, a method includes: determining, by a controller associated with an aftertreatment system, satisfaction of an enabling condition; in response to the satisfaction of the enabling condition, pausing, by the controller, hydrocarbon dosing in a regeneration cycle of the aftertreatment system; and upon pausing of the hydrocarbon dosing, monitoring, by the controller, an oxidation catalyst of the aftertreatment system for a light-off shift condition.

In accordance with another aspect of the present disclosure, a non-transitory computer-readable media has computer-readable instructions stored thereon that, when executed by a controller of an aftertreatment system, cause the controller to: determine satisfaction of an enabling condition; upon satisfaction of the enabling condition, pause hydrocarbon dosing in a regeneration cycle of the aftertreatment system; and upon pausing of the hydrocarbon dosing, monitor by the controller, an oxidation catalyst of the aftertreatment system for a light-off shift condition.

In accordance with yet another aspect of the present disclosure, a system includes: an aftertreatment system having an oxidation catalyst and a controller associated with the aftertreatment system. The controller is configured to determine satisfaction of an enabling condition, upon satisfaction of the enabling condition, pause hydrocarbon dosing in a regeneration cycle of the aftertreatment system, and upon pausing of the hydrocarbon dosing, monitor by the controller, an oxidation catalyst of the aftertreatment system for a light-off shift condition.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

This application is directed to an aftertreatment system designed to treat exhaust gases emitted from an engine. The aftertreatment system may remove various types of undesirable constituents from the exhaust gas before releasing the treated exhaust gas into the atmosphere. The aftertreatment system may include an oxidation catalyst to oxidize nitric oxide and decompose unburnt hydrocarbons from the exhaust gas emitted from the engine. The exhaust gas may also pass through a particulate filter to remove particulate matter, such as soot, from the exhaust gas. The aftertreatment system may additionally include a decomposition chamber, which receives a reductant that is converted into gaseous ammonia and mixed with the exhaust gas exiting the particulate filter. The mixture of the exhaust gas and gaseous ammonia is diverted to a selective catalytic reduction ("SCR") system where the gaseous ammonia is catalyzed to reduce NOx in the exhaust gas before being released into the atmosphere.

As the exhaust gas passes through the particulate filter, particulate matter such as soot, in the exhaust gas may get trapped on the surfaces or walls of the particulate filter. As particulate matter builds up on these surfaces or walls of the particulate filter, the efficiency of the particulate filter decreases. To maintain the efficiency or reduce the degradation of the particulate filter, periodically the particulate filter is heated to a temperature that is high enough to burn the trapped particulate matter and regenerate the filter. In some embodiments, the temperature of the particulate filter may be increased by injecting hydrocarbon fuel upstream of the oxidation catalyst. The injected hydrocarbon may be oxidized within the oxidation catalyst to generate heat and increase the temperature of the exhaust gas. When the heated exhaust gas travels to the particulate filter, the heat from the exhaust gas may cause the trapped particulate matter to burn, thereby regenerating the particulate filter. Each cycle of periodic regeneration of the particulate filter by injecting hydrocarbon into the oxidation catalyst is referred to herein as a regeneration cycle.

Some vehicles or applications may use a fuel having a high sulfur content. In these vehicles or applications, at least some of the sulfur in the fuel may pass through the exhaust gas that is emitted from the engine. Thus, the exhaust gas may include a high sulfur content as well. This high sulfur content may poison the oxidation catalyst. Specifically, the oxidation catalyst is configured to operate optimally or normally at certain temperatures (e.g., around and above 250° C.). When operating optimally, the oxidation catalyst oxidizes majority or substantially all of the hydrocarbon that is injected into the oxidation catalyst during a regeneration cycle. The temperature at the inlet of the oxidation catalyst during optimal operation is referred to herein as a light-off temperature. The high sulfur content within the exhaust gas may shift (e.g., increase) the light-off temperature of the oxidation catalyst, thereby poisoning the oxidation catalyst.

When the oxidation catalyst is poisoned (e.g., the light-off temperature of the oxidation catalyst is shifted (e.g., increased)), the oxidation catalyst no longer oxidizes the majority of the injected hydrocarbon during a regeneration cycle at the light-off temperature. For example, if the light-off temperature of the oxidation catalyst is about 250° C., with the high sulfur content, the light-off temperature may increase to about 290° C. In these cases, below 290° C., the oxidation catalyst does not effectively oxidize the majority of the injected hydrocarbon. During a regeneration cycle, if the hydrocarbon is dosed or injected into the oxidation catalyst at a fixed temperature that is based on the light-off temperature, a greater amount of the dosed hydrocarbon may slip through the oxidation catalyst if the light-off temperature of the oxidation catalyst has shifted. The non-oxidized hydrocarbon that slips through the oxidation catalyst may reduce the efficiency of the particulate filter and the SCR system, which in turn may impact the overall treatment of the exhaust gas and could possibly result in violations of certain emission standards.

The present disclosure provides an effective mechanism for detecting the shift in the light-off temperature of the oxidation catalyst and modifying the hydrocarbon dosing into the oxidation catalyst.

Figure 1:
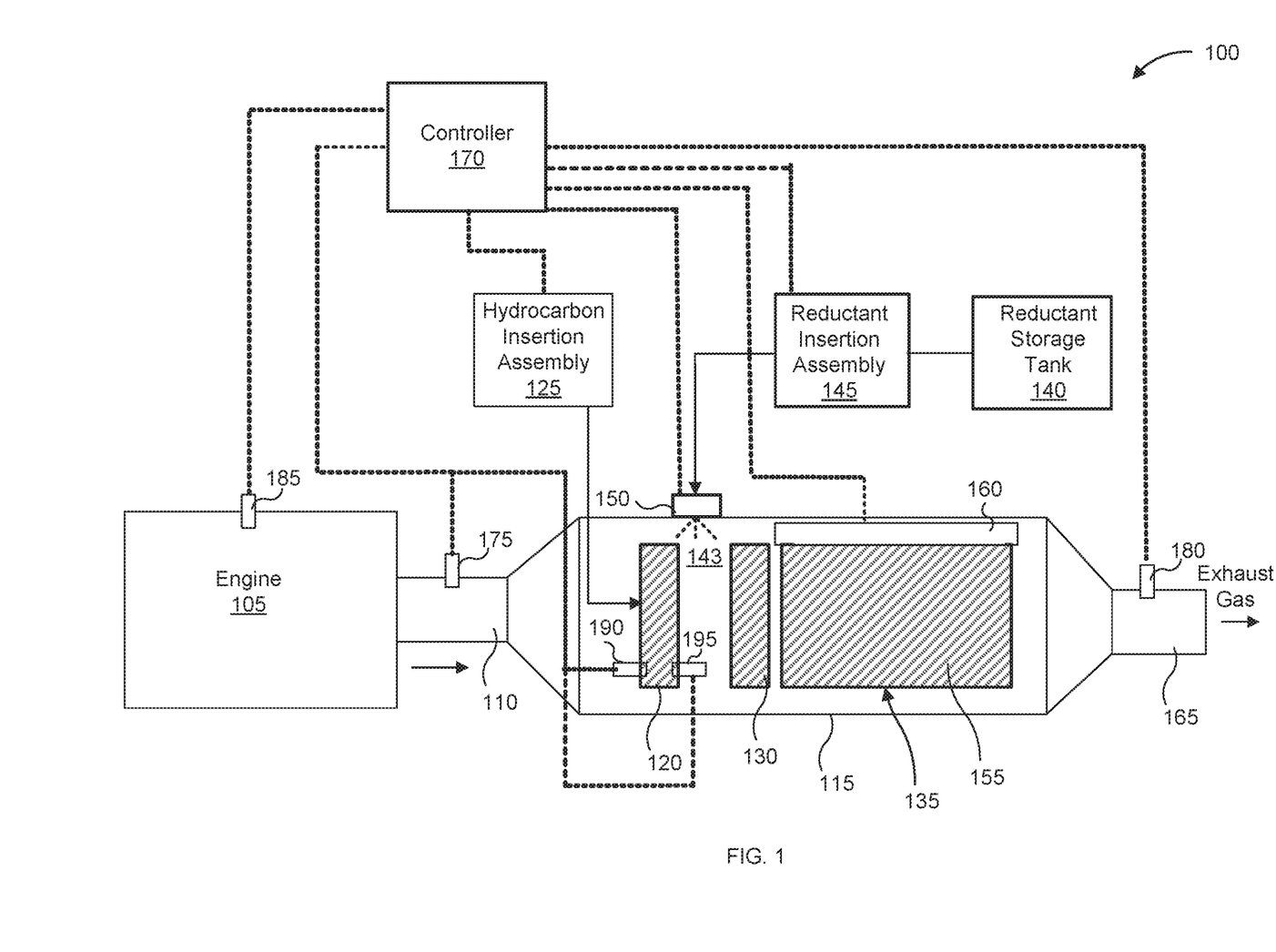
FIG. 1 is an example block diagram of an aftertreatment system, in accordance with some embodiments of the present disclosure.

Referring now to FIG. 1, an example block diagram of an aftertreatment system 100 is shown, in accordance with some embodiments of the present disclosure. The aftertreatment system 100 is configured to receive exhaust gas from an engine 105. The engine 105 may be a compression ignited internal combustion engine such as a diesel engine, a spark-ignited internal combustion engine such as a gasoline engine, or any other types of engine such as a natural gas engine, a dual fuel engine, a biodiesel engine, an E-85 engine, etc. The engine 105 emits exhaust gas as a result of combustion of air from the atmosphere with fuel. The exhaust gas is discharged from the engine 105, via an inlet conduit 110, into a housing 115.

The housing 115 defines an internal volume within which one or more elements for treating the exhaust gas are disposed. To withstand the operating conditions, the housing 115 may be formed from a rigid, heat-resistant, and corrosion-resistant material such as stainless steel, iron, aluminum, metals, ceramics, or any other suitable material. Although the housing 115 has been shown in FIG. 1 as having a particular shape and size, the housing may have any suitable cross-section (e.g., circular, square, rectangular, oval, elliptical, polygonal, etc.) and any suitable size. The housing 115 may house an oxidation catalyst 120 for oxidizing nitric oxide and decomposing unburnt hydrocarbons from the exhaust gas. In some embodiments, the oxidation catalyst 120 may be a diesel oxidation catalyst ("DOC") or other type of oxidation catalyst that is suitable for use in the aftertreatment system 100.

In some embodiments, the aftertreatment system 100 may include a hydrocarbon insertion assembly 125 for selectively injecting a hydrocarbon (e.g., fuel) into the oxidation catalyst 120. The oxidation catalyst 120 may catalyze ignition of the hydrocarbon so as to increase a temperature of the exhaust gas during a regeneration cycle. In some embodiments, the aftertreatment system 100 may also include a particulate filter 130 within the housing 115. The particulate filter 130 may be disposed downstream or upstream of the oxidation catalyst 120. When positioned "upstream" of the oxidation catalyst 120, the particulate filter 130 may be positioned between the inlet conduit 110 and the oxidation catalyst such that the exhaust gas exiting the particulate filter enters the oxidation catalyst. When positioned "downstream" of the oxidation catalyst 120, the particulate filter 130 may be positioned, as shown, between the oxidation catalyst and a selective catalytic reduction ("SCR") system 135 such that the exhaust gas exiting the oxidation catalyst enters the particulate filter. In some embodiments, an instance of the particulate filter 130 may be provided both upstream and downstream of the oxidation catalyst 120. In some embodiments, multiple instances of the particulate filter 130 may be provided, either upstream of the oxidation catalyst 120 and/or downstream of the oxidation catalyst.

The particulate filter 130 may be configured to remove particulate matter (e.g., soot, debris, inorganic particles, etc.) from the exhaust gas. The particulate matter (e.g., soot) that is removed from the exhaust gas may become trapped on one or more surfaces (e.g., walls) of the particulate filter 130. Periodically (e.g. at pre-determined distances covered by the associated vehicle, at pre-determined times, etc.), the particulate filter 130 may be regenerated to combust the particulate matter trapped on the surface(s) of the particulate filter. In some embodiments, the regeneration of the particulate filter 130 may be accomplished by heating the particulate filter to a temperature that is high enough to combust the trapped particulate matter. In other embodiments, the particulate filter 130 may be regenerated by injecting fuel via the hydrocarbon insertion assembly 125 upstream of the oxidation catalyst 120. Injecting fuel upstream of the oxidation catalyst 120 oxidizes that fuel in the oxidation catalyst 120 to generate the heat required to initiate the combustion of the trapped particulate matter in the particulate filter 130. The particulate filter 130 may be any of a variety of filters that are suitable for use within the aftertreatment system 100. For example, in some embodiments, the particulate filter 130 may be a diesel particulate filter ("DPF") having a ceramic filter (e.g. cordierite), and may be symmetric or asymmetric. In some embodiments, the particulate filter 130 may be catalyzed. In some embodiments, the oxidation catalyst 120 and the particulate filter 130 may be integrated into a single component.

The housing 115 may also include the SCR system 135 that is configured to reduce constituents such as oxides of nitrogen (NOx) gases, carbon monoxide (CO) gases, hydrocarbons, etc. from the exhaust gas. The SCR system 135 may include or be associated with a decomposition chamber 143 that is configured to receive reductant from a reductant storage tank 140 via a reductant insertion assembly 145. A reductant port 150 may be positioned on a sidewall of the housing 115 to allow insertion of the reductant into an internal volume of the decomposition chamber 143. In some embodiments, the reductant port 150 may include a reductant injector that is configured to combine a flow of reductant received via the reductant port with compressed air, and deliver a stream or a jet of the reductant-air combination into the decomposition chamber 143. In some embodiments, the reductant injector may be a nozzle of a predetermined diameter. In other embodiments, other mechanisms may be used to selectively deliver the reductant into the decomposition chamber 143. Thus, the decomposition chamber 143 may be configured to receive exhaust gas and a reductant, and facilitate mixing of the exhaust gas with the reductant to form an exhaust gas-reductant mixture. In some embodiments, mixers, baffles, vanes, or other structures may be used in conjunction with the decomposition chamber 143 to further facilitate mixing of the reductant with the exhaust gas.

The decomposition chamber 143 may be positioned in a variety of locations. For example, in some embodiments, the decomposition chamber 143 may be positioned upstream of the SCR system 135 to allow the reductant to be inserted, via the reductant port 150, into the decomposition chamber 143 upstream of the SCR system. In other embodiments, the decomposition chamber 143 may be structured such that the reductant port 150 is configured to allow the reductant to be inserted directly into the SCR system 135. In yet other embodiments, the decomposition chamber 143 may be disposed in the inlet conduit 110. While the decomposition chamber 143 is shown to be upstream of the particulate filter 130 in FIG. 1, the decomposition chamber may instead be located downstream of the particulate filter 130 and upstream of the SCR system 135.

The reductant that is injected into the decomposition chamber via the reductant port 150 may be stored within the reductant storage tank 140. The reductant facilitates decomposition of the constituents of the exhaust gas (e.g., NOx gases included in the exhaust gas). Any suitable reductant may be used depending upon the constituents of the exhaust gas. For example, in some embodiments, the exhaust gas may include a diesel exhaust gas and the reductant may include a diesel exhaust fluid (e.g., the diesel exhaust fluid marketed under the name ADBLUE®) such as urea, an aqueous solution of urea, or any other fluid that includes ammonia. When aqueous urea solution is used for the reductant, the solution may include a particular ratio of urea to water. For example, in some embodiments, the ratio may be 32.5% by volume of urea and 67.5% by volume of deionized water, 40% by volume of urea and 60% by volume of deionized water, or any other suitable ratio of urea to deionized water. The reductant from the reductant storage tank 140 may be selectively inserted into the decomposition chamber by the reductant insertion assembly 145. The reductant insertion assembly 145 may include various structures to facilitate receipt of the reductant from the reductant storage tank 140 and delivery to the reductant port 150. For example, the reductant insertion assembly 145 may include, or be associated with various pumps, valves, screens, filters, etc. that facilitate receiving the reductant from the reductant storage tank 140 and supplying that reductant to the reductant port 150.

Further, in some embodiments, the reductant may be inserted into the decomposition chamber in liquid form or in gaseous form. In some embodiments, the reductant port 150, and particularly the reductant injector associated with the reductant port, may be configured to inject the reductant in liquid form. In such embodiments, the reductant port 150 may constitute or be part of a "wet doser" or "liquid doser." In other embodiments, a vaporizer may be associated with the reductant port 150, the reductant injector, and/or the reductant insertion assembly 145 to vaporize or convert the liquid reductant into gaseous form before insertion into the housing 115. Whether inserted in liquid form or gaseous form, upon being injected into the decomposition chamber, the reductant undergoes evaporation, thermolysis, and/or hydrolysis to form gaseous ammonia, which is then mixed with the exhaust gas to form the exhaust gas-reductant mixture. The exhaust gas-reductant mixture may then flow over an SCR catalyst 155 of the SCR system 135.

The SCR catalyst 155 is formulated to decompose certain constituents in the exhaust gas using the gaseous ammonia as a reagent in the presence of the SCR catalyst. Specifically, the SCR catalyst 155 causes the gaseous ammonia in the exhaust gas to catalyze, thereby reducing the NOx in the exhaust gas during the oxidation reaction. In some embodiments, the SCR catalyst 155 may include a metal-zeolite catalyst including, but not limited to Cu-CHA-Zeolite (e.g., a Cu-SSZ-13 catalyst), but also other zeolite structures including Cu-SAPO-34 catalyst, Cu-LTA, Cu-AEI, Cu-ZSM, Cu-beta, Cu-Chabazite, or any other suitable catalyst. In other embodiments, the SCR catalyst 155 may include a vanadium, an iron-zeolite, or a copper/iron-zeolite catalyst. In still other embodiments, the SCR catalyst 155 may include a multi-zone catalyst, for example, having a first zone including a copper-zeolite catalyst, and a second zone including an iron-zeolite catalyst, or vice versa. The SCR catalyst 155 may be disposed on a suitable substrate such as, for example, a ceramic (e.g., cordierite) or metallic (e.g., kanthal) monolith core which may, for example, define a honeycomb structure. A washcoat may also be used as a carrier material for the SCR catalyst 155. Such washcoat materials may include, for example, aluminum oxide, titanium dioxide, silicon dioxide, any other suitable washcoat material, or a combination thereof. The monolith core may be securely positioned in a can to form the SCR system 135, which may be installed in the aftertreatment system 100. In some embodiments, a heater 160 may be coupled to the SCR system 135 and configured to heat the exhaust gas within the SCR system and/or the decomposition chamber. In some embodiments, the SCR system 135 may include a selective catalytic reduction filter (SCRF). The treated exhaust gas (e.g., treated to reduce constituents such as NOx gases, unburnt hydrocarbons, etc.) is expelled, via an outlet conduit 165, into the environment.

Although the oxidation catalyst 120, the particulate filter 130, the decomposition chamber, and the SCR system 135 have been described as being disposed within a single housing (e.g., the housing 115), in some embodiments, one or more of those components may be disposed in separate housings and connected together in operable association. Further, although a single instance of each of the oxidation catalyst 120, the particulate filter 130, the decomposition chamber, and the SCR system 135 has been described, in some embodiments, multiple instances of one or more of those elements may be provided within the aftertreatment system 100, if suitable.

Referring still to FIG. 1, the aftertreatment system 100 also includes a controller 170 that is configured to control operation of the various elements of the aftertreatment system in treating the exhaust gas. For example, the controller 170 may be operably connected to the reductant insertion assembly 145 to instruct the reductant insertion assembly to selectively deliver the reductant from the reductant storage tank 140 to the reductant port 150. The controller 170 may also be operably connected to the reductant port 150 to selectively operate the reductant port to insert the reductant received from the reductant storage tank 140 into the decomposition chamber. In some embodiments, the reductant insertion assembly 145 may be configured to control operation of the reductant port 150.

The controller 170 may also be configured to control the hydrocarbon insertion assembly 125 to selectively insert hydrocarbons into the oxidation catalyst 120 during a regeneration cycle and control the heater 160 to operate the heater when needed. The controller 170 may also be connected to other elements of the aftertreatment system 100 that are controlled by the controller. The controller 170 may be operably coupled to the various components of the aftertreatment system 100 using any type and any number of wired or wireless connections. For example, in some embodiments, a wired connection such as a serial cable, a fiber optic cable, a CAT5 cable, etc. may be used to communicably connect the controller 170 to one or more elements of the aftertreatment system 100. In other embodiments, a wireless connection such as the Internet, Wi-Fi, cellular, radio, Bluetooth, ZigBee, etc. may be used. In some embodiments, a combination of wired and wireless connections may be used. Further, in some embodiments, a controller area network (CAN) bus may provide the exchange of signals, information, and/or data between the controller 170 and the various elements of the aftertreatment system 100.

The controller 170 may include or be associated with one or more processing units. The processing unit(s) may include a microprocessor, programmable logic controller (PLC) chip, an application specific integrated circuit (ASIC), one or more field programmable gate arrays (FPGAs), a digital signal processor (DSP), a group of processing components, or other suitable electronic processing components. The processing unit(s) of the controller 170 may be configured to execute instructions for performing the operations described herein. The processing unit(s) may be implemented in hardware, firmware, software, or any combination thereof. "Executing an instruction" means that the processing unit(s) may perform operation(s) called for by that instruction. The processing unit(s) may retrieve the instruction from a memory associated with the controller 170 for execution and copy the instruction in an executable form to a physical memory. In some embodiments, the processing unit(s) may be configured to execute the instruction without first copying the instruction to the physical memory. The instruction may be written using one or more programming languages, scripting languages, assembly languages, etc. Thus, the controller 170, via its associated processing unit(s), may be configured to execute instructions, algorithms, commands, or programs stored in the memory associated with the controller.

Although a single controller (e.g., the controller 170) configured to control multiple elements (e.g., the reductant insertion assembly 145, the hydrocarbon insertion assembly 125, the heater 160, etc.) of the aftertreatment system 100 is shown, in some embodiments, separate controllers for one or more of those elements may be used. The controller 170 may include or be associated with other hardware, software, and/or firmware components that may be needed or considered useful to have in performing the functions described herein. The controller 170 may be configured to control the reductant insertion assembly 145, the hydrocarbon insertion assembly 125, the heater 160, and any other element of the aftertreatment system 100 that is controlled by the controller based on data received from one or more sensors, such as sensors 175, 180, 185, 190, and 195.

In some embodiments, the sensor 175 may be positioned to measure one or more parameters in the exhaust gas flowing through the inlet conduit 110. The sensor 175 may include a NOx sensor configured to measure an amount of NOx gases in the exhaust gas flowing into the housing 115. In some embodiments, the sensor 175 may include a temperature sensor to measure the temperature of the exhaust gas at the inlet of the housing 115. In some embodiments, the sensor 175 may include a pressure sensor, an oxygen sensor, a particulate matter sensor, or any other sensor to measure a parameter that may be needed or considered desirable for the controller 170 to have in controlling the various elements of the aftertreatment system 100. Further, although a single sensor (e.g., the sensor 175) is shown in the inlet conduit 110, in some embodiments, multiple sensors positioned at various locations of the inlet conduit may be used. Further, in some embodiments, a single instance of the sensor 175 may be configured to measure a single parameter (e.g., temperature, NOx amount, etc.), while in other embodiments, the single instance of the sensor may be configured to measure multiple parameters.

Similarly, the sensor 180 may be positioned to measure one or more parameters in the exhaust gas flowing through the outlet conduit 165, and the sensor 185 may be positioned to measure one or more parameters associated with the engine 105. Similar to the sensor 175, the sensor 180 may include a single sensor or multiple sensors, and may be configured to measure needed or desirable parameter(s) such as amount of NOx gases expelled into the environment, temperature, pressure, particulate matter, ammonia (e.g., to determine ammonia slip), etc. Likewise, the sensor 185 may include a single sensor or multiple sensors, and may be configured to measure one or more operating parameters from the engine 105.

The sensor 190 may be positioned at an inlet of the oxidation catalyst 120 and the sensor 195 may be positioned at the outlet of the oxidation catalyst. In some embodiments, the sensors 190 and 195 may be temperature sensors to measure the inlet and outlet temperatures, respectively, of the oxidation catalyst 120. In some embodiments, the sensors 190 and 195 may include single or multiple sensors, and may be configured to measure parameters in addition to temperature, such as pressure, flow rate, etc.

Although the sensors 175, 180, 185, 190, and 195 have been shown in the aftertreatment system 100 as being positioned in specific locations, the positioning of those sensors may vary as desired. Further, additional or fewer sensors across various suitable locations of the aftertreatment system 100 may be used. The sensors 175-195 may be physical sensors or virtual sensors. The sensors 175-195 may be configured to collect data and transmit that data to the controller 170. Based on the data, the controller 170 may then control operation of other elements (e.g., the hydrocarbon insertion assembly 125, the reductant insertion assembly 145, the heater 160, etc.) of the aftertreatment system 100, as discussed in greater detail below.

Although certain components of the aftertreatment system 100 are shown and described in FIG. 1, the aftertreatment system may include other or additional elements that may be suitable. For example, in some embodiments, the aftertreatment system 100 may include an ammonia slip catalyst ("ASC") or ammonia oxidation catalyst ("AMOx") to reduce ammonia slip by which ammonia that is not catalyzed by the SCR catalyst 155 may be decomposed. In some embodiments, the aftertreatment system 100 may include mixers, baffle plates, secondary filters (e.g., a secondary partial flow or catalyzed filter), or any other component that may be needed or considered desirable in properly operating the aftertreatment system 100.

Figure 2:
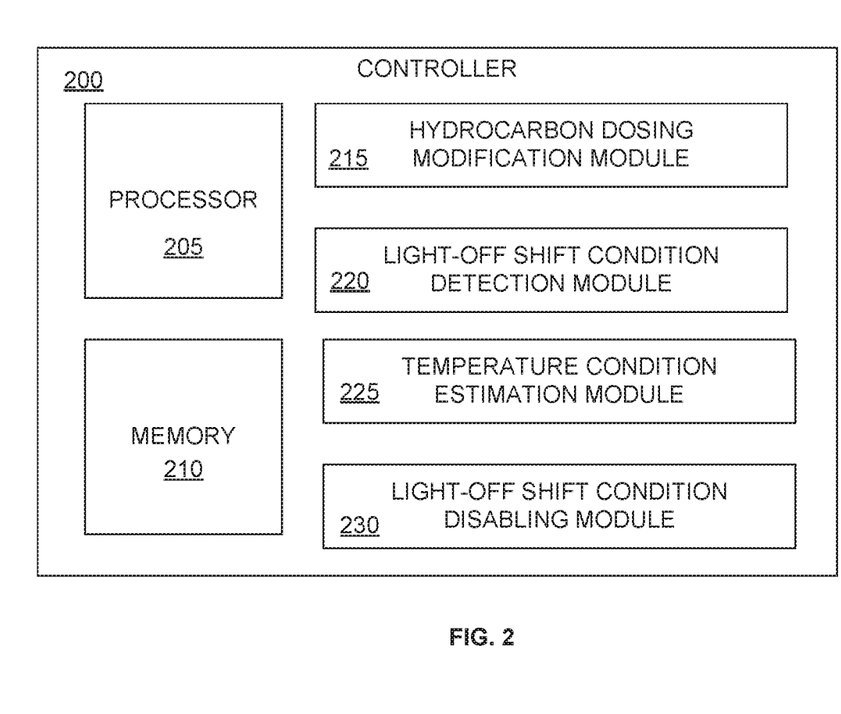
FIG. 2 is an example block diagram of a controller of the aftertreatment system of FIG. 1, in accordance with some embodiments of the present disclosure.

Turning to FIG. 2, an example block diagram of a controller 200 is shown, in accordance with some embodiments of the present disclosure. The controller 200 corresponds to the controller 170 of FIG. 1. The controller 200 may be configured to modify a regeneration cycle of the oxidation catalyst 120 and the particulate filter 130 to reduce an impact of high sulfur in the exhaust gas.

The controller 200 may include a processor 205 configured to execute computer-readable instructions stored in a computer-readable memory 210. The processor 205 may be implemented in hardware, firmware, software, or any combination thereof. The processor 205 may retrieve instruction (s) from the memory 210 for execution. The memory 210 may be any of a variety of memories that may be suitable for use with the controller 200. For example, in some embodiments, the memory 210 may include Static Random Access Memory (SRAM), Dynamic Random Access Memory (DRAM), Magnetoresistive Random Access Memory (MRAM), Phase Control Memory (PCM), Resistive Random Access Memory (ReRAM), 3D XPoint memory, ferroelectric random-access memory (FeRAM), flash memory, hard disk drive memory, floppy disk memory, magnetic tape memory, optical disk memory, and/or other types of volatile, non-volatile, and semi-volatile memories that may be considered suitable.

The controller 200 may also include a hydrocarbon dosing modification module 215, a light-off shift condition detection module 220, a temperature condition estimation module 225, and a light-off shift condition disabling module 230. Although the hydrocarbon dosing modification module 215, the light-off shift condition detection module 220, the temperature condition estimation module 225, and the light-off shift condition disabling module 230 are shown as separate components of the controller 200, in some embodiments, at least some of those modules may be integrated together and the integrated module may perform the functions of the individuals modules that have been integrated. Further, although not shown, in some embodiments, one or more of the hydrocarbon dosing modification module 215, the light-off shift condition detection module 220, the temperature condition estimation module 225, and the light-off shift condition disabling module 230 may have respective processing unit(s) and memory unit(s) to perform their respective functions, as described herein. In other embodiments, one or more of the hydrocarbon dosing modification module 215, the light-off shift condition detection module 220, the temperature condition estimation module 225, and the light-off shift condition disabling module 230 may use the processor 205 and the memory 210.

The hydrocarbon dosing modification module 215 may be configured to modify hydrocarbon dosing during a regeneration cycle based upon satisfaction of an enabling condition. The hydrocarbon dosing modification module 215 may receive sensor data from one or more of the sensors 175-195 of FIG. 1, and detect satisfaction of the enabling condition based on the sensor data. Upon detecting the satisfaction of the enabling condition, the hydrocarbon dosing modification module 215 may temporarily pause hydrocarbon dosing from the hydrocarbon insertion assembly 125. The enabling condition that the hydrocarbon dosing modification module 215 monitors may be any of a variety of enabling conditions.

For example, in some embodiments, the enabling condition may determine whether an amount of hydrocarbon that has been dosed into the oxidation catalyst 120 from the hydrocarbon insertion assembly 125 in one regeneration cycle (e.g., the current regeneration cycle) is greater than a predetermined dosing threshold. In some embodiments, the controller 200 may measure the amount of hydrocarbon dosed from the hydrocarbon insertion assembly 125 into the oxidation catalyst 120 by a sensor, not shown, at an outlet of the hydrocarbon insertion assembly. In other embodiments, the sensor to measure the amount of hydrocarbon dosed from the hydrocarbon insertion assembly 125 may be located at other locations. In some embodiments, the controller 200 may use other or additional mechanisms to determine the amount of hydrocarbon dosed into the oxidation catalyst 120. When the hydrocarbon dosing modification module 215 determines that a predetermined amount of hydrocarbon has been dosed into the oxidation catalyst 120 during the regeneration cycle, the hydrocarbon dosing modification module may pause hydrocarbon dosing from the hydrocarbon insertion assembly 125. For example, when the amount of hydrocarbon dosing becomes equal to or exceeds the predetermined dosing threshold, the hydrocarbon dosing modification module 215 may pause the hydrocarbon dosing from the hydrocarbon insertion assembly 125.

Another enabling condition may be a determination that a predetermined amount of time has passed since the start of hydrocarbon dosing in one regeneration cycle (e.g., the current regeneration cycle). For example, upon instructing the hydrocarbon insertion assembly 125 to start the hydrocarbon dosing during a regeneration cycle, the hydrocarbon dosing modification module 215 may measure the amount of time passed since the start of the hydrocarbon dosing. In some embodiments, the hydrocarbon dosing modification module 215 may measure the amount of time passed by way of a timer. For example, upon instructing the hydrocarbon insertion assembly 125 to start the hydrocarbon dosing during a regeneration cycle, the hydrocarbon dosing modification module 215 may reset the timer. When the hydrocarbon insertion assembly 125 starts hydrocarbon dosing, the timer may be configured to start tracking time. When the timer shows that the predetermined amount of time has passed, the hydrocarbon dosing modification module 215 may determine that the enabling condition has been satisfied. The predetermined amount of time may be a predetermined time threshold. In other embodiments, the hydrocarbon dosing modification module 215 may employ other or additional mechanisms to determine that the predetermined time threshold has been met.

Yet another enabling condition may determine whether a space velocity is within a predetermined space velocity range. As used herein, "space velocity" means the relation between the volumetric flow of exhaust gas through the oxidation catalyst 120 and a volume (e.g., bed volume) of the oxidation catalyst. For example, in some embodiments, the space velocity may be computed by dividing the volumetric flow rate of the exhaust gas through the oxidation catalyst 120 by the volume of the oxidation catalyst. In some embodiments, the hydrocarbon dosing modification module 215 may be programmed with the volume of the oxidation catalyst 120. Thus, depending upon the type and size of the oxidation catalyst 120, the hydrocarbon dosing modification module 215 may know the volume of the oxidation catalyst. Further, the hydrocarbon dosing modification module 215 may determine the volumetric flow rate of exhaust gas through the oxidation catalyst from sensor data gathered by one or more of the sensors 175-195 of FIG. 1, or any other sensors configured to sense the volumetric flow rate through the oxidation catalyst, or using other mechanisms.

Upon computing the space velocity, the hydrocarbon dosing modification module 215 may determine if the computed value of the space velocity is within the predetermined space velocity range. For example, the hydrocarbon dosing modification module 215 may determine whether the computed value of the space velocity is equal to or greater than a predetermined minimum space velocity threshold but less than or equal to a predetermined maximum space velocity threshold. If the computed value of the space velocity falls within and including the predetermined minimum space velocity threshold and the predetermined maximum space velocity threshold, the hydrocarbon dosing modification module 215 may determine that the enabling condition is satisfied. In other embodiments, the hydrocarbon dosing modification module 215 may determine that the enabling condition is satisfied upon exceeding the predetermined minimum space velocity threshold or upon being lower than the predetermined maximum space velocity threshold.

Yet another enabling condition may determine whether an inlet temperature of the oxidation catalyst 120 during a regeneration cycle is within a predetermined temperature range. If the hydrocarbon dosing modification module 215 determines that the inlet temperature of the oxidation catalyst (e.g., as measured by the sensor 190) during a regeneration cycle is within the predetermined temperature range, then the enabling condition may be considered satisfied. In some embodiments, the hydrocarbon dosing modification module 215 may measure the rate of increase of the inlet temperature of the oxidation catalyst 120. When the increase in the inlet temperature of the oxidation catalyst 120 for a predetermined unit of time becomes equal to or exceeds a predetermined inlet temperature rate of change threshold, the hydrocarbon dosing modification module 215 may determine that the enabling condition is satisfied. In yet other embodiments, the hydrocarbon dosing modification module 215 may, additionally or alternatively, use the outlet temperature of the oxidation catalyst (e.g., as measured by the sensor 195) during a regeneration cycle and compare that outlet temperature to an outlet temperature threshold for determining satisfaction of the enabling condition. In some embodiments, the hydrocarbon dosing modification module 215 may compute the rate of temperature increase in the outlet temperature of the oxidation catalyst 120 for determining satisfaction of an enabling condition.

Thus, the hydrocarbon dosing modification module 215 may be programmed to monitor a variety of enabling conditions. In some embodiments, the enabling conditions may include additional or other enabling conditions than the ones described above.

The hydrocarbon dosing modification module 215 may be programmed to pause the hydrocarbon dosing upon satisfaction of one or more enabling conditions. In some embodiments, the hydrocarbon dosing modification module 215 may be configured to pause the hydrocarbon dosing from the hydrocarbon insertion assembly 125 upon detecting satisfaction of any one of multiple enabling conditions. In other embodiments, the hydrocarbon dosing modification module 215 may be configured to pause hydrocarbon dosing only upon satisfaction of a subset of the enabling conditions. In yet other embodiments, the hydrocarbon dosing modification module 215 may be configured to pause hydrocarbon dosing only upon satisfaction of all the enabling conditions.

In addition to pausing hydrocarbon dosing, the hydrocarbon dosing modification module 215 may also be programmed to resume hydrocarbon dosing when certain other conditions are met. For example, upon pausing the hydrocarbon dosing, the hydrocarbon dosing modification module 215 may send an indication (e.g., notification, signal, etc.) to the light-off shift condition detection module 220 and/or the temperature condition estimation module 225 that the hydrocarbon dosing has been paused for triggering additional events within those modules, as discussed below. The hydrocarbon dosing modification module 215 may also receive an indication from the light-off shift condition detection module 220 when the light-off shift condition detection module detects a light-off shift condition. Upon receiving the indication from the light-off shift condition detection module 220 that a light-off shift condition has been detected, the hydrocarbon dosing modification module 215 may continue to pause the hydrocarbon dosing. Upon not receiving the indication from the light-off shift condition detection module 220 within a predetermined amount of time of sending the indication to the light-off shift condition detection module that the hydrocarbon has been paused, or upon receiving an indication that no light-off shift condition has been detected, the hydrocarbon dosing modification module 215 may resume hydrocarbon dosing.

Similarly, upon a light-off shift condition being detected by the light-off shift condition detection module 220, the hydrocarbon dosing modification module 215 may receive an indication back from the temperature condition estimation module indicating that the inlet temperature of the oxidation catalyst 120 is greater than a predetermined temperature threshold. Upon receiving such an indication, the hydrocarbon dosing modification module 215 may resume the hydrocarbon dosing.

In some embodiments, the hydrocarbon dosing modification module 215 may be programmed with other conditions or receive indications from other modules of the controller 200 to resume hydrocarbon dosing or continue pausing hydrocarbon dosing. Thus, the hydrocarbon dosing modification module 215 may be configured to pause hydrocarbon dosing in a regeneration cycle upon satisfaction of one or more enabling conditions, and resume hydrocarbon dosing upon receiving indications from the light-off shift condition detection module 220, the temperature condition estimation module 225, or upon satisfaction of other programmed condition(s).

The light-off shift condition detection module 220 is configured to detect a light-off shift condition in the oxidation catalyst 120. The term "light-off temperature," as used herein, refers to an inlet temperature (or possibly outlet temperature) of the oxidation catalyst 120 during a regeneration cycle at which a majority or predetermined amount of hydrocarbon that is dosed by the hydrocarbon insertion assembly 125 into the oxidation catalyst is fully or substantially fully burned within the oxidation catalyst. The oxidation catalyst 120 that is able to fully or substantially fully burn the dosed hydrocarbon at the light-off temperature is said to be a normal or optimally operating oxidation catalyst. The oxidation catalyst 120 that is unable to fully or substantially fully burn the dosed hydrocarbon at the light-off temperature may be considered abnormal or poisoned. A poisoned oxidation catalyst may fully or substantially fully burn the dosed hydrocarbon at a temperature (e.g., inlet or outlet temperature of the oxidation catalyst 120) that is greater than the light-off temperature. This shift in the light-off temperature is referred to herein as the "light-off shift condition." For example, in some embodiments, when the oxidation catalyst 120 is normal, the light-off temperature at the inlet of the oxidation catalyst may be about 250° Celsius. When the oxidation catalyst 120 is poisoned, the light-off temperature may be greater than 250° Celsius (e.g., 290° C., 300° C., etc.).

The light-off shift condition detection module 220 is configured to detect a light-off shift condition in the oxidation catalyst 120. In other words, the light-off shift condition detection module 220 is configured to detect when the light-off temperature of the oxidation catalyst 120 is greater than the light-off temperature of a normal oxidation catalyst. By detecting the light-off shift condition, the light-off shift condition detection module 220 may determine whether the oxidation catalyst 120 has been poisoned. The light-off shift condition detection module 220 may be programmed to know the light-off temperature of a normal oxidation catalyst. Based upon the light-off temperature of a normal oxidation catalyst, the light-off shift condition detection module 220 may determine the light-off shift condition in multiple ways. For example, in some embodiments, the light-off shift condition detection module 220 may detect the light-off shift condition based upon a thermal efficiency of the oxidation catalyst 120.

In some embodiments, the light-off shift condition detection module 220 may compute the thermal efficiency of the oxidation catalyst 120 by determining an exotherm or amount of heat (e.g., potential energy) released by the oxidation catalyst 120 during a regeneration cycle. In some embodiments, the light-off shift condition detection module 220 may compute the thermal efficiency/exotherm using the following formula:

$$\eta_{doc} = \frac{\int_a^b \left( \dot{m}_{exhaust} \times \left[ \frac{C_{pdocout} \times T_{docout} -}{C_{pdocin} \times T_{docin}} \right] + \dot{T}_{DOCbed} \times C_{pdoc} \right) dt}{\int_a^b (LHV_{diesel} \times \eta_{expect} \times \dot{m}_{HC}) dt}$$

Where:

$\eta_{doc}$=normalized thermal efficiency or exotherm of the oxidation catalyst 120

$\dot{m}_{exhaust}$=exhaust mass flow of the exhaust gas through the oxidation catalyst 120

$C_{p\ doc\ out}$=exhaust gas flow heat capacity at the outlet of the oxidation catalyst 120

$T_{doc\ out}$=exhaust gas temperature at the outlet of the oxidation catalyst 120

$C_{p\ doc\ in}$=exhaust gas flow heat capacity at the inlet of the oxidation catalyst 120

$T_{doc\ in}$=exhaust gas temperature at the inlet of the oxidation catalyst 120

$\dot{T}_{DOC\ bed}$=bed temperature change rate of the oxidation catalyst 120

$C_{p\ doc}$=heat capacity of the oxidation catalyst 120

$LHV_{diesel}$=diesel fuel lower heating value $\eta_{expect}$=expected conversion efficiency of the oxidation catalyst 120

$\dot{m}_{HC}$=mass flow of the dosed hydrocarbon into the oxidation catalyst 120

Upon computing the thermal efficiency or exotherm of the oxidation catalyst 120 using the formula above, the light-off shift condition detection module 220 may compare the computed value with a predetermined minimum efficiency threshold. If the computed thermal efficiency or exotherm values falls below the predetermined minimum efficiency threshold, the light-off shift condition detection module 220 may conclude that a light-off shift condition has been detected. The predetermined minimum efficiency threshold may be a value that is associated with a normal oxidation catalyst in which the light-off is achieved at the light-off temperature. In other embodiments, the light-off shift condition detection module 220 may compute the thermal efficiency or exotherm of the oxidation catalyst 120 using other mechanisms.

In some embodiments, the light-off shift condition detection module 220 may determine the light-off shift condition based upon a rate of change in an outlet temperature of the oxidation catalyst 120. For a normal oxidation catalyst, the outlet temperature of the oxidation catalyst 120 (e.g., as measured by the sensor 195) during a regeneration cycle may gradually increase. However, for a poisoned oxidation catalyst, the outlet temperature of the oxidation catalyst 120 may remain substantially the same or even decrease. Thus, the light-off shift condition detection module 220 may monitor the rate of change in the outlet temperature of the oxidation catalyst 120 during a regeneration cycle. In some embodiments, the light-off shift condition detection module 220 may detect the rate of change in the outlet temperature of the oxidation catalyst 120 by measuring a first outlet temperature of the oxidation catalyst at a first time, measuring a second outlet temperature of the oxidation catalyst at a second time that is after the first time, and computing the rate of change based upon the difference between the first outlet temperature and the second outlet temperature, and the difference between the first time and the second time. In other embodiments, the light-off shift condition detection module 220 may measure the rate of change in the outlet temperature of the oxidation catalyst 120 in other ways. The light-off shift condition detection module 220 may also compare the rate of change in the outlet temperature of the oxidation catalyst 120 with a predetermined rate of change threshold. If at any point during the regeneration cycle, the rate of change of the outlet temperature becomes lower than or equal to the predetermined rate of change threshold, the light-off shift condition detection module 220 may determine that the light-off shift condition has occurred.

Thus, in some embodiments, the light-off shift condition detection module 220 may detect the light-off shift condition by measuring the thermal efficiency of the oxidation catalyst 120. In other embodiments, the light-off shift condition detection module 220 may detect the light-off shift condition based upon the rate of change in the outlet temperature of the oxidation catalyst 120. In yet other embodiments, the light-off shift condition detection module 220 may detect the light-off shift condition based upon other or additional parameters or conditions being satisfied. Upon detecting the light-off shift condition, the light-off shift condition detection module 220 may send an indication to the hydrocarbon dosing modification module 215 that a light-off shift condition has been detected. In some embodiments, if the light-off shift condition detection module 220 does not detect a light-off shift condition within a predetermined period of time, the light-off shift condition detection module may send an indication to the hydrocarbon dosing modification module 215 that no light-off shift condition has been detected. In addition, the light-off shift condition detection module 220 may send an indication to the light-off shift condition disabling module 230 upon detecting a light-off shift condition.

Referring still to FIG. 2, the temperature condition estimation module 225 may be configured to monitor the inlet temperature of the oxidation catalyst 120 upon pausing of the hydrocarbon dosing by the hydrocarbon dosing modification module 215. The temperature condition estimation module 225 may receive an indication from the hydrocarbon dosing modification module 215 that the hydrocarbon dosing has been paused. Upon receiving that indication, the temperature condition estimation module 225 may start monitoring the inlet temperature of the oxidation catalyst 120 (e.g., via monitoring the sensor data from the sensor 190). When the temperature condition estimation module 225 determines that the inlet temperature of the oxidation catalyst 120 has reached a predetermined temperature threshold, the temperature condition estimation module may send an indication to the hydrocarbon dosing modification module 215. As indicated above, for a poisoned oxidation catalyst, the light-off temperature of the oxidation catalyst 120 may increase. If upon detecting the light-off shift condition, the inlet temperature of the oxidation catalyst 120 increases or reaches the shifted light-off temperature, the oxidation catalyst 120 effectively behaves like a normal oxidation catalyst. Thus, the predetermined temperature threshold that the temperature condition estimation module 225 compares the inlet temperature of the oxidation catalyst 120 against may be based upon the shifted light-off temperature of the oxidation catalyst.

The light-off shift condition disabling module 230 may be configured to disable the light-off shift condition detection by the light-off shift condition detection module 220. The light-off shift condition disabling module 230 may be configured to track a number of light-off shift conditions that have been detected by the light-off shift condition detection module 220. In some embodiments, the light-off shift condition detection module 220 may send an indication to the light-off shift condition disabling module 230 each time a light-off shift condition is detected. The light-off shift condition disabling module 230 may increment the value of a counter each time the indication is received from the light-off shift condition detection module 220. Further, each time the indication is received from the light-off shift condition detection module 220, the light-off shift condition disabling module 230 may also compare the value of the counter with a predetermined event threshold. When the light-off shift condition disabling module 230 determines that the counter value has become greater than the predetermined event threshold, the light-off shift condition disabling module may send an indication to the light-off shift condition detection module 220 to pause light-off shift condition detection. In some embodiments, the light-off shift condition disabling module 230 may also send an indication to the hydrocarbon dosing modification module 215 to resume hydrocarbon dosing (in case the hydrocarbon dosing was paused) and/or to pause monitoring of the enabling conditions. In some embodiments, the light-off shift condition disabling module 230 may also raise an alarm or take other actions upon the counter value exceeding the predetermined event threshold.

Further, in some embodiments, the light-off shift condition disabling module 230 may start a timer upon the counter value becoming greater than the predetermined event threshold. When the timer value exceeds a predetermined time threshold, the light-off shift condition disabling module may send another indication to the light-off shift condition detection module 220 to resume light-off shift condition detection and/or to the hydrocarbon dosing modification module 215 to start monitoring the enabling condition(s) again. Thus, the light-off shift condition disabling module 230 may be configured to pause the light-off shift condition detection after a predetermined number of light-off shift conditions have been detected. By pausing the light-off shift condition detection after a predetermined number of light-off shift conditions have been detected, the light-off shift condition disabling module 230 ensures that the pausing/unpausing cycles of hydrocarbon dosing do not significantly impact the regeneration cycles of the oxidation catalyst 120.

Figure 3:
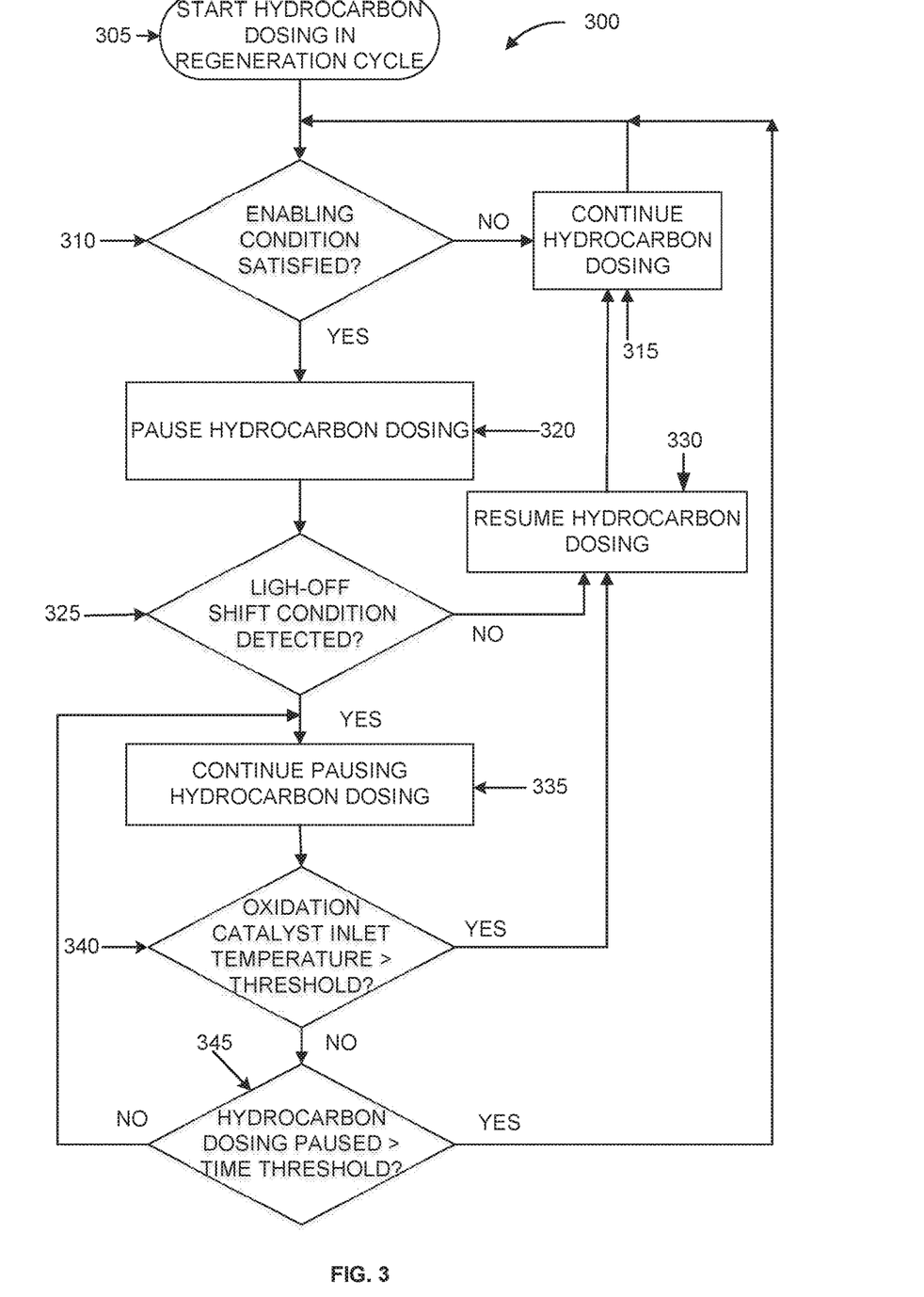
FIG. 3 is an example flow diagram outlining operations performed by the controller of FIG. 2 for modifying a regeneration cycle of the aftertreatment systems of FIG. 1, in accordance with some embodiments of the present disclosure.

Turning now to FIG. 3, an example flow chart outlining a process 300 for modifying a regeneration cycle is shown, in accordance with some embodiments of the present disclosure. The process 300 is implemented by the controller 200, and particularly by the hydrocarbon dosing modification module 215, the light-off shift condition detection module 220, the temperature condition estimation module 225, and the light-off shift condition disabling module 230 of the controller. The process 300 starts at operation 305 with the start of a regeneration cycle. To start the regeneration cycle, the controller 200 may issue a regeneration request to the hydrocarbon insertion assembly 125. In some embodiments, the controller 200 may need to enter a thermal management mode to issue the regeneration request and start the regeneration cycle. Upon receiving the regeneration request from the controller 200, the hydrocarbon insertion assembly 125 may start dosing the oxidation catalyst 120 with hydrocarbon. In some embodiments, the hydrocarbon insertion assembly 125 may be programmed to dose the hydrocarbon at a predetermined dosing rate (e.g., the amount of hydrocarbon to dose per unit time). In other embodiments, the regeneration request from the controller 200 may indicate the dosing rate for the hydrocarbon.

In some embodiments, the controller 200 may also send the regeneration request to the hydrocarbon dosing modification module 215. In other embodiments, the controller 200 may send another request to the hydrocarbon dosing modification module 215 upon issuing the regeneration request to the hydrocarbon insertion assembly 125. Upon receiving the regeneration request or another request indicating start of a regeneration cycle, the hydrocarbon dosing modification module 215 starts monitoring the enabling conditions at operation 310. As discussed above, the enabling conditions may be based upon an amount of dosed hydrocarbon, an amount of time since the start of hydrocarbon dosing, space velocity, inlet temperature of the oxidation catalyst 120, etc. In some embodiments, the hydrocarbon dosing modification module 215 may be configured to determine that the enabling condition has been satisfied when any one enabling condition is satisfied. In other embodiments, the hydrocarbon dosing modification module 215 may be configured to determine that the enabling condition is satisfied only when all or a subset of the enabling conditions that the hydrocarbon dosing modification module is monitoring are satisfied.

If the enabling condition is not satisfied, the hydrocarbon dosing modification module 215 continues the hydrocarbon dosing by the hydrocarbon insertion assembly 125 at operation 315. From the operation 315, the process 300 loops back to the operation 310 where the hydrocarbon dosing modification module 215 continues to monitor the one or more enabling conditions, as discussed above, for the remainder of the regeneration cycle. If the hydrocarbon dosing modification module 215 determines, at the operation 310, that the enabling condition has been satisfied, the process 300 proceeds to operation 320. At the operation 320, the hydrocarbon dosing modification module 215 modifies the regeneration cycle of the operation 305 by pausing the hydrocarbon dosing.

In some embodiments, the hydrocarbon dosing modification module 215 may send an indication to the hydrocarbon insertion assembly 125 to pause the hydrocarbon dosing. The pausing of the hydrocarbon dosing by the hydrocarbon insertion assembly 125 does not impact the regeneration request sent by the controller 200 that started the regeneration cycle at the operation 305. That regeneration request remains active. Only the operation of the hydrocarbon insertion assembly 125 is impacted. Similarly, if the controller 200 entered into a thermal management mode to start the regeneration cycle, the thermal management mode remains active while the hydrocarbon dosing is paused at the operation 320. Upon receiving an indication from the hydrocarbon dosing modification module 215 to pause hydrocarbon dosing, the hydrocarbon insertion assembly stops inserting hydrocarbon into the oxidation catalyst 120. Along with sending the indication to the hydrocarbon insertion assembly 125, the hydrocarbon dosing modification module 215 may also send an indication to the light-off shift condition detection module 220. The hydrocarbon dosing modification module 215 may also start a timer to keep track of the amount of time passed since the pausing of the hydrocarbon dosing at the operation 320.

At operation 325, upon receiving the indication from the hydrocarbon dosing modification module 215, the light-off shift condition detection module 220 determines whether the light-off shift condition has been detected. As discussed above, the light-off shift condition detection module 220 may detect the light-off shift condition by computing the thermal efficiency of the oxidation catalyst and determining if the computed thermal efficiency or exotherm falls below the minimum efficiency threshold. In some embodiments, the light-off shift condition detection module 220 may detect the light-off shift condition based upon the rate of change of outlet temperature of the oxidation catalyst 120 falling below the rate of change threshold. In some embodiments, the light-off shift condition detection module 220 may detect that the light-off shift condition has been satisfied only upon the thermal efficiency falling below the minimum efficiency threshold and the rate of change of the outlet temperature of the oxidation catalyst falling below the rate of change threshold.

In some embodiments, upon not detecting the light-off shift condition within a pre-determined period of time since receiving the indication from the hydrocarbon dosing modification module 215 indicating pausing of hydrocarbon dosing, the light-off shift condition detection module 220 may send a response indication to the hydrocarbon dosing modification module. The response indication may indicate that the light-off shift condition has not been detected. Upon receiving the response indication, the hydrocarbon dosing modification module 215 may resume hydrocarbon dosing at operation 330. In some embodiments, upon not receiving an indication from the light-off shift condition detection module 220 within a predetermined period of time indicating detection of a light-off shift condition, the hydrocarbon dosing modification module 215 may resume hydrocarbon dosing at the operation 330.

Resuming the hydrocarbon dosing means that the hydrocarbon dosing modification module 215 may send an indication to the hydrocarbon insertion assembly 125 to restart the hydrocarbon dosing that was paused at the operation 320. Since the regeneration request from the controller 200 is still active and/or the controller is still within the thermal management mode, a new regeneration request is not needed from the controller to resume the hydrocarbon dosing. Similarly, since the controller 200 is already in the thermal management mode, there is no need for the controller to reenter the thermal management mode. By keeping the regeneration request active and/or by remaining in the thermal management mode, no changes are needed to the program or schedule for regeneration cycles. From the operation 330 resuming the hydrocarbon dosing, the process 300 loops back to the operation 315 and to the operation 310 for monitoring of the enabling conditions as discussed above.

On the other hand, if at the operation 325, the light-off shift condition detection module 220 detects a light-off shift condition, the light-off shift condition detection module sends a response indication to the hydrocarbon dosing modification module 215. The light-off shift condition detection module 220 may also send an indication to the temperature condition estimation module 225 to monitor the inlet temperature of the oxidation catalyst 120 and an indication to the light-off shift condition disabling module 230 to increment a counter tracking the number of detected light-off shift condition events in the regeneration cycle that started at the operation 305.

At operation 335, upon receiving the response indication from the light-off shift condition detection module 220, the hydrocarbon dosing modification module 215 continues to pause hydrocarbon dosing. The regeneration request from the controller 200 and/or the thermal management mode that the controller entered for starting the regeneration cycle continues to remain active. At operation 340, the temperature condition estimation module 225, which starts tracking the inlet temperature of the oxidation catalyst 120 when the light-off shift condition is detected, determines whether the inlet temperature of the oxidation catalyst exceeds the predetermined inlet temperature threshold. If the temperature condition estimation module 225 determines that the inlet temperature of the oxidation catalyst 120 has exceeded the predetermined inlet temperature threshold, the temperature condition estimation module may send an indication to the hydrocarbon dosing modification module 215, which resumes the hydrocarbon dosing at the operation 330.

On the other hand, if the temperature condition estimation module 225 does not detect that the inlet temperature of the oxidation catalyst 120 has exceeded the predetermined inlet temperature threshold, the process 300 proceeds to operation 345. At the operation 345, if the hydrocarbon dosing modification module 215 determines that the predetermined time threshold has passed since the hydrocarbon dosing was paused at the operation 320, the hydrocarbon dosing modification module resumes hydrocarbon dosing and returns to the operation 310 to continue monitoring for satisfaction of an enabling condition. In some embodiments, the predetermined time threshold may be based on the timer that the hydrocarbon dosing modification module 215 started at the operation 320. If the predetermined time threshold has not passed at the operation 345, the process 300 loops back to the operation 335 to continue pausing the hydrocarbon dosing until either the predetermined time threshold passes or the inlet temperature of the oxidation catalyst 120 exceeds the predetermined inlet temperature threshold.

Figure 4:
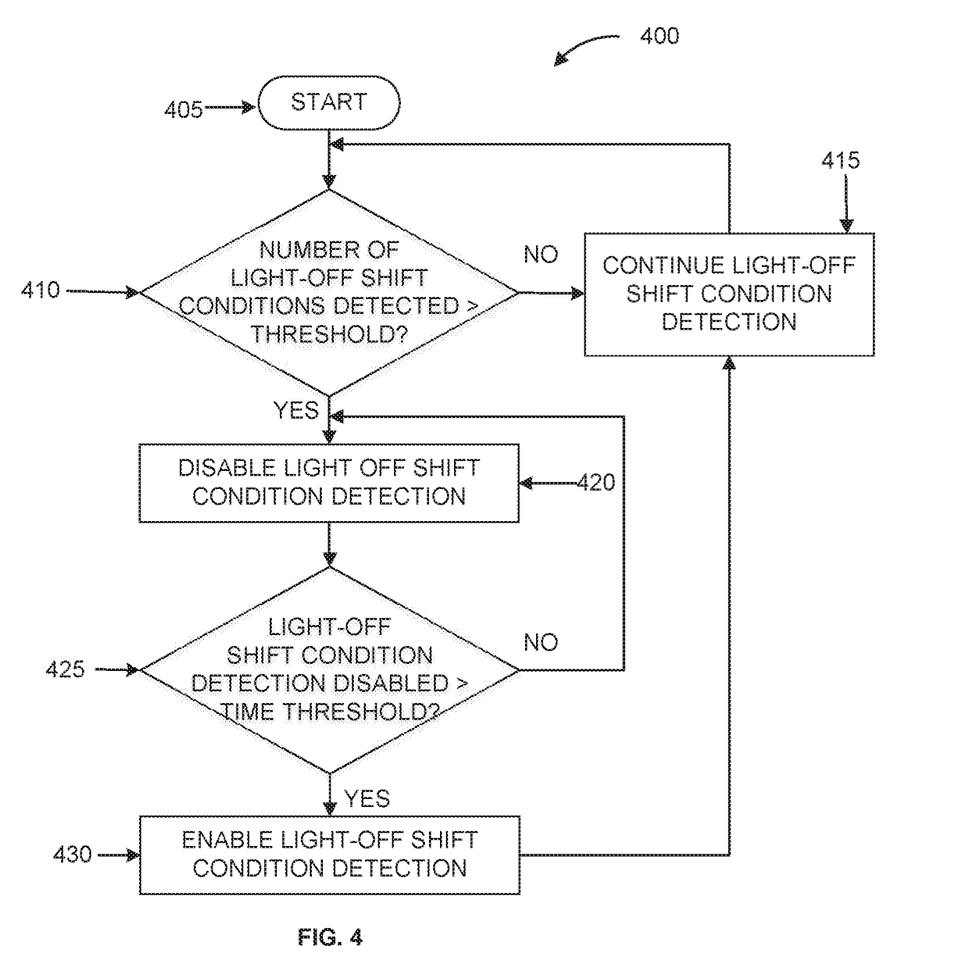
FIG. 4 is an example flow chart outlining additional operations performed by the controller of FIG. 2 for modifying the regeneration cycle of FIG. 3, in accordance with some embodiments of the present disclosure.

Referring to FIG. 4, another example flow chart outlining a process 400 is shown, in accordance with some embodiments of the present disclosure. The process 400 is implemented by the controller 200, and particularly by the hydrocarbon dosing modification module 215, the light-off shift condition detection module 220, the temperature condition estimation module 225, and the light-off shift condition disabling module 230 of the controller. Further, the process 400 is performed during the same regeneration cycle as the process 300. Thus, the processes 300 and 400 are repeated for each regeneration cycle. The process 400 starts at operation 405 with the light-off shift condition disabling module 230 receiving an indication from the light-off shift condition detection module 220 at the operation 325 upon detecting a light-off shift condition. At operation 410, the light-off shift condition disabling module 230 determines whether a number of the light-off shift conditions detected in the regeneration cycle that started at the operation 305 is greater than the event threshold. As discussed above, the light-off shift condition disabling module 230 may increment a counter each time a light-off shift condition is detected in the regeneration cycle. If the light-off shift condition disabling module 230 determines that the counter value does not exceed the event threshold, the process 400 proceeds to operation 415 where the process 300 is continued and the light-off shift condition detection module 220 continues to detect light-off shift conditions.

If the light-off shift condition disabling module 230 determines, at the operation 410, that the counter value exceeds the event threshold, the light-off shift condition disabling module disables the light-off shift condition detection temporarily at operation 420. To disable the light-off shift condition detection, the light-off shift condition disabling module 230 may send an indication to the light-off shift condition detection module 220. Upon receiving the indication, the light-off shift condition detection module 220 may override any indication received from the hydrocarbon dosing modification module 215 indicating that the enabling condition has been satisfied. Thus, the light-off shift condition detection module 220 may temporarily suspend the operation 325. In some embodiments, the light-off shift condition disabling module 230 may also send an indication to the hydrocarbon dosing modification module 215 to suspend monitoring of the enabling conditions of the operation 310. If the hydrocarbon dosing is paused when the hydrocarbon dosing modification module 215 receives the indication from the light-off shift condition disabling module 230, the hydrocarbon dosing modification module may resume the hydrocarbon dosing.

Upon temporarily suspending the light-off shift condition detection, the light-off shift condition disabling module 230 may start a timer. At operation 425, the light-off shift condition disabling module 230 compares the value of the timer with a time threshold. If the timer value does not exceed the time threshold, the light-off shift condition disabling module 230 continues to disable the light-off shift condition detection and the process 400 loops back to the operation 420. Upon detecting that the timer value has exceeded the time threshold, the light-off shift condition disabling module 230 enables the light-off shift condition detection at operation 430. To enable the light-off shift condition detection, the light-off shift condition disabling module 230 may send an indication to the light-off shift condition detection module 220, which may resume responding to indications from the hydrocarbon dosing modification module 215 and detecting light-off shift conditions. In some embodiments, the light-off shift condition disabling module 230 may also send an indication to the hydrocarbon dosing modification module 215, which may start tracking the enabling conditions.

Thus, the processes 300 and 400 provide a mechanism to modify the regeneration cycle of the operation 305 without requiring any modification to the regeneration request or the thermal management mode of the controller 200.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As used herein, the term "about" generally mean plus or minus 10% of the stated value. For example, about 0.5 would include 0.45 and 0.55, about 10 would include 9 to 11, about 1000 would include 900 to 1100.

The term "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination

What is claimed is:

1. A non-transitory computer-readable media having computer-readable instructions stored thereon that when executed by a controller of an aftertreatment system cause the controller to:
   determine satisfaction of an enabling condition, wherein the satisfaction of the enabling condition comprises at least one of an inlet temperature of an oxidation catalyst being within a predetermined temperature range, a space velocity of the oxidation catalyst being within a predetermined space velocity range, an amount of a hydrocarbon dosed being greater than a predetermined dosing threshold, an amount of time passed since a start of the hydrocarbon dosing being greater than a predetermined time threshold, or a rate of change of the inlet temperature being greater than a predetermined inlet temperature rate of change threshold;
   upon satisfaction of the enabling condition, pause hydrocarbon dosing in a regeneration cycle of the aftertreatment system; and
   upon pausing of the hydrocarbon dosing, monitor by the controller, the oxidation catalyst of the aftertreatment system for a light-off shift condition.

2. The non-transitory computer-readable media of claim 1, wherein the controller further executes computer-readable instructions to:
   upon detecting the light-off shift condition within a predetermined time period, by the controller:
      continue pausing the hydrocarbon dosing,
      monitor an inlet temperature of the oxidation catalyst, and
      resume the hydrocarbon dosing upon the inlet temperature exceeding a predetermined inlet temperature threshold.

3. The non-transitory computer-readable media of claim 2, wherein the controller further executes computer-readable instructions to:
   determine that a first time period has passed since the detection of the light-off shift condition; and
   resume the hydrocarbon dosing upon the passing of the first time period even if the inlet temperature has not exceeded the predetermined inlet temperature threshold.

4. The non-transitory computer-readable media of claim 3, wherein the controller further executes computer-readable instructions to:
   determine that a number of times the light-off shift condition has been detected is greater than an event threshold;
   disable the light-off shift condition detection upon the number of times being greater than the event threshold;
   determine that the light-off shift condition detection has been disabled for greater than a second time period; and
   enable the light-off shift condition detection upon expiration of the second time period.

5. The non-transitory computer-readable media of claim 2, wherein, to detect the light-off shift condition, the controller further executes computer-readable instructions to:
   determine a thermal efficiency of the oxidation catalyst; and
   detect the light-off shift condition upon the thermal efficiency falling below a minimum efficiency threshold.

6. The non-transitory computer-readable media of claim 5, wherein the controller further executes computer-readable instructions to compute the thermal efficiency as a function of the inlet temperature of the oxidation catalyst, an outlet temperature of the oxidation catalyst, and a mass flow of injected hydrocarbon into the oxidation catalyst.

7. The non-transitory computer-readable media of claim 2, wherein, to detect the light-off shift condition, the controller further executes computer-readable instructions to:
   detect a rate of change in an outlet temperature of the oxidation catalyst; and
   detect the light-off shift condition upon the rate of change falling below a rate of change threshold.

8. The non-transitory computer-readable media of claim 7, wherein to detect the rate of change, the controller further executes computer-readable instructions to:
   measure a first outlet temperature of the oxidation catalyst;
   measure a second outlet temperature of the oxidation catalyst, wherein the second outlet temperature is measured after an amount of time has passed since measuring of the first outlet temperature; and
   compute the rate of change based upon the first outlet temperature, the second outlet temperature, and the amount of time.

9. The non-transitory computer-readable media of claim 2, wherein, to detect the light-off shift condition, the controller further executes computer-readable instructions to:
   measure a thermal efficiency of the oxidation catalyst;
   measure a rate of change in an outlet temperature of the oxidation catalyst; and
   detect the light-off shift condition upon the thermal efficiency falling below a minimum efficiency threshold and the rate of change falling below a rate of change threshold.

10. The non-transitory computer-readable media of claim 1, wherein the satisfaction of the enabling condition comprises the inlet temperature being within the predetermined temperature range, the space velocity of the oxidation catalyst being within the predetermined space velocity range, the amount of the hydrocarbon dosed being greater than the predetermined dosing threshold, the amount of time passed since the start of the hydrocarbon dosing being greater than the predetermined time threshold, and the rate of change of the inlet temperature being greater than the predetermined inlet temperature rate of change threshold.

11. A system comprising:
   the aftertreatment system comprising the oxidation catalyst; and
   the controller of claim 1.

12. A non-transitory computer-readable media having computer-readable instructions stored thereon that when executed by a controller of an aftertreatment system cause the controller to:
   determine satisfaction of an enabling condition;
   upon satisfaction of the enabling condition, pause hydrocarbon dosing in a regeneration cycle of the aftertreatment system;
   upon pausing of the hydrocarbon dosing, monitor by the controller, an oxidation catalyst of the aftertreatment system for a light-off shift condition;
   upon detecting the light-off shift condition within a predetermined time period:
      continue pausing the hydrocarbon dosing,
      monitor an inlet temperature of the oxidation catalyst, and
      resume the hydrocarbon dosing upon the inlet temperature exceeding a predetermined inlet temperature threshold;
   determine that a first time period has passed since the detection of the light-off shift condition; and resume the hydrocarbon dosing upon the passing of the first time period even if the inlet temperature has not exceeded the predetermined inlet temperature threshold.

13. A system comprising:
the aftertreatment system comprising the oxidation catalyst; and
the controller of claim 12.

14. A non-transitory computer-readable media having computer-readable instructions stored thereon that when executed by a controller of an aftertreatment system cause the controller to:
determine satisfaction of an enabling condition;
upon satisfaction of the enabling condition, pause hydrocarbon dosing in a regeneration cycle of the aftertreatment system;
upon pausing of the hydrocarbon dosing, monitor by the controller, an oxidation catalyst of the aftertreatment system for a light-off shift condition; and
upon detecting the light-off shift condition within a predetermined time period:
continue pausing the hydrocarbon dosing,
monitor an inlet temperature of the oxidation catalyst, and
resume the hydrocarbon dosing upon the inlet temperature exceeding a predetermined inlet temperature threshold;
wherein, to detect the light-off shift condition, the controller further comprises computer-readable instructions to:
detect a rate of change in an outlet temperature of the oxidation catalyst; and
detect the light-off shift condition upon the rate of change falling below a rate of change threshold.

15. A system comprising:
the aftertreatment system comprising the oxidation catalyst; and
the controller of claim 14.

16. A non-transitory computer-readable media having computer-readable instructions stored thereon that when executed by a controller of an aftertreatment system cause the controller to:
determine satisfaction of an enabling condition;
upon satisfaction of the enabling condition, pause hydrocarbon dosing in a regeneration cycle of the aftertreatment system;
upon pausing of the hydrocarbon dosing, monitor by the controller, an oxidation catalyst of the aftertreatment system for a light-off shift condition; and
upon detecting the light-off shift condition within a predetermined time period:
continue pausing the hydrocarbon dosing,
monitor an inlet temperature of the oxidation catalyst, and
resume the hydrocarbon dosing upon the inlet temperature exceeding a predetermined inlet temperature threshold;
wherein, to detect the light-off shift condition, the controller further comprises computer-readable instructions to:
detect a rate of change in an outlet temperature of the oxidation catalyst; and
detect the light-off shift condition upon the rate of change falling below a rate of change threshold; and
wherein, to detect the rate of change, the controller further comprises computer-readable instructions to:
measure a first outlet temperature of the oxidation catalyst;
measure a second outlet temperature of the oxidation catalyst, wherein the second outlet temperature is measured after an amount of time has passed since measuring of the first outlet temperature; and
compute the rate of change based upon the first outlet temperature, the second outlet temperature, and the amount of time.

17. A system comprising:
the aftertreatment system comprising the oxidation catalyst; and
the controller of claim 16.

18. A non-transitory computer-readable media having computer-readable instructions stored thereon that when executed by a controller of an aftertreatment system cause the controller to:
determine satisfaction of an enabling condition;
upon satisfaction of the enabling condition, pause hydrocarbon dosing in a regeneration cycle of the aftertreatment system;
upon pausing of the hydrocarbon dosing, monitor by the controller, an oxidation catalyst of the aftertreatment system for a light-off shift condition; and
upon detecting the light-off shift condition within a predetermined time period:
continue pausing the hydrocarbon dosing,
monitor an inlet temperature of the oxidation catalyst, and
resume the hydrocarbon dosing upon the inlet temperature exceeding a predetermined inlet temperature threshold;
wherein, to detect the light-off shift condition, the controller further comprises computer-readable instructions to:
measure a thermal efficiency of the oxidation catalyst;
measure a rate of change in an outlet temperature of the oxidation catalyst; and
detect the light-off shift condition upon the thermal efficiency falling below a minimum efficiency threshold and the rate of change falling below a rate of change threshold.

19. A system comprising:
the aftertreatment system comprising the oxidation catalyst; and
the controller of claim 18.

20. A non-transitory computer-readable media having computer-readable instructions stored thereon that when executed by a controller of an aftertreatment system cause the controller to:
determine satisfaction of an enabling condition;
upon satisfaction of the enabling condition, pause hydrocarbon dosing in a regeneration cycle of the aftertreatment system;
upon pausing of the hydrocarbon dosing, monitor by the controller, an oxidation catalyst of the aftertreatment system for a light-off shift condition;
upon detecting the light-off shift condition within a predetermined time period:
continue pausing the hydrocarbon dosing,
monitor an inlet temperature of the oxidation catalyst, and
resume the hydrocarbon dosing upon the inlet temperature exceeding a predetermined inlet temperature threshold;
determine that a first time period has passed since the detection of the light-off shift condition;

resume the hydrocarbon dosing upon the passing of the first time period even if the inlet temperature has not exceeded the predetermined inlet temperature threshold;

determine that a number of times the light-off shift condition has been detected is greater than an event threshold;

disable the light-off shift condition detection upon the number of times being greater than the event threshold;

determine that the light-off shift condition detection has been disabled for greater than a second time period; and enable the light-off shift condition detection upon expiration of the second time period.

21. A system comprising:

the aftertreatment system comprising the oxidation catalyst; and the controller of claim 20.

22. A non-transitory computer-readable media having computer-readable instructions stored thereon that when executed by a controller of an aftertreatment system cause the controller to:

determine satisfaction of an enabling condition, wherein the satisfaction of the enabling condition comprises the inlet temperature being within the predetermined temperature range, the space velocity of the oxidation catalyst being within the predetermined space velocity range, the amount of the hydrocarbon dosed being greater than the predetermined dosing threshold, the amount of time passed since the start of the hydrocarbon dosing being greater than the predetermined time threshold, and the rate of change of the inlet temperature being greater than the predetermined inlet temperature rate of change threshold;

upon satisfaction of the enabling condition, pause hydrocarbon dosing in a regeneration cycle of the aftertreatment system; and upon pausing of the hydrocarbon dosing, monitor by the controller, an oxidation catalyst of the aftertreatment system for a light-off shift condition.

23. A system comprising:

the aftertreatment system comprising the oxidation catalyst; and the controller of claim 22.

* * * * *